United States Patent [19]

Albany et al.

[11] 4,354,052
[45] Oct. 12, 1982

[54] PATIO ENCLOSURE WITH ELECTRICAL CONDUIT HOUSING

[75] Inventors: Stanley J. Albany, Costa Mesa; Robert Lizardi, Jr., Mission Viejo, both of Calif.

[73] Assignee: C-Thru Aluminum Awning Co., Fullerton, Calif.

[21] Appl. No.: 215,672

[22] Filed: Dec. 12, 1980

[51] Int. Cl.³ .............................................. H02G 3/28
[52] U.S. Cl. .......................................... 174/48; 52/220
[58] Field of Search ...................... 174/48, 49; 52/220, 52/221

[56] References Cited

U.S. PATENT DOCUMENTS 3,377,756  4/1968  Polhamus ........................ 174/48 X

*Primary Examiner*—Thomas J. Kozma
*Assistant Examiner*—D. A. Tone
*Attorney, Agent, or Firm*—Allan D. Mockabee

[57] ABSTRACT

Panel construction for prefabricated patio enclosures wherein a channel-like housing is formed in the inner side to receive electrical conductors, the channel being formed in part by a frame portion of the panel having a cross web and at least one secondary web extending at an angle thereto to define walls of the housing, and wherein the secondary web or webs fix the spacing between two cross webs to provide a fixed width aperture adapted to removably receive a closure strip which retains and conceals the electrical conductors.

3 Claims, 4 Drawing Figures

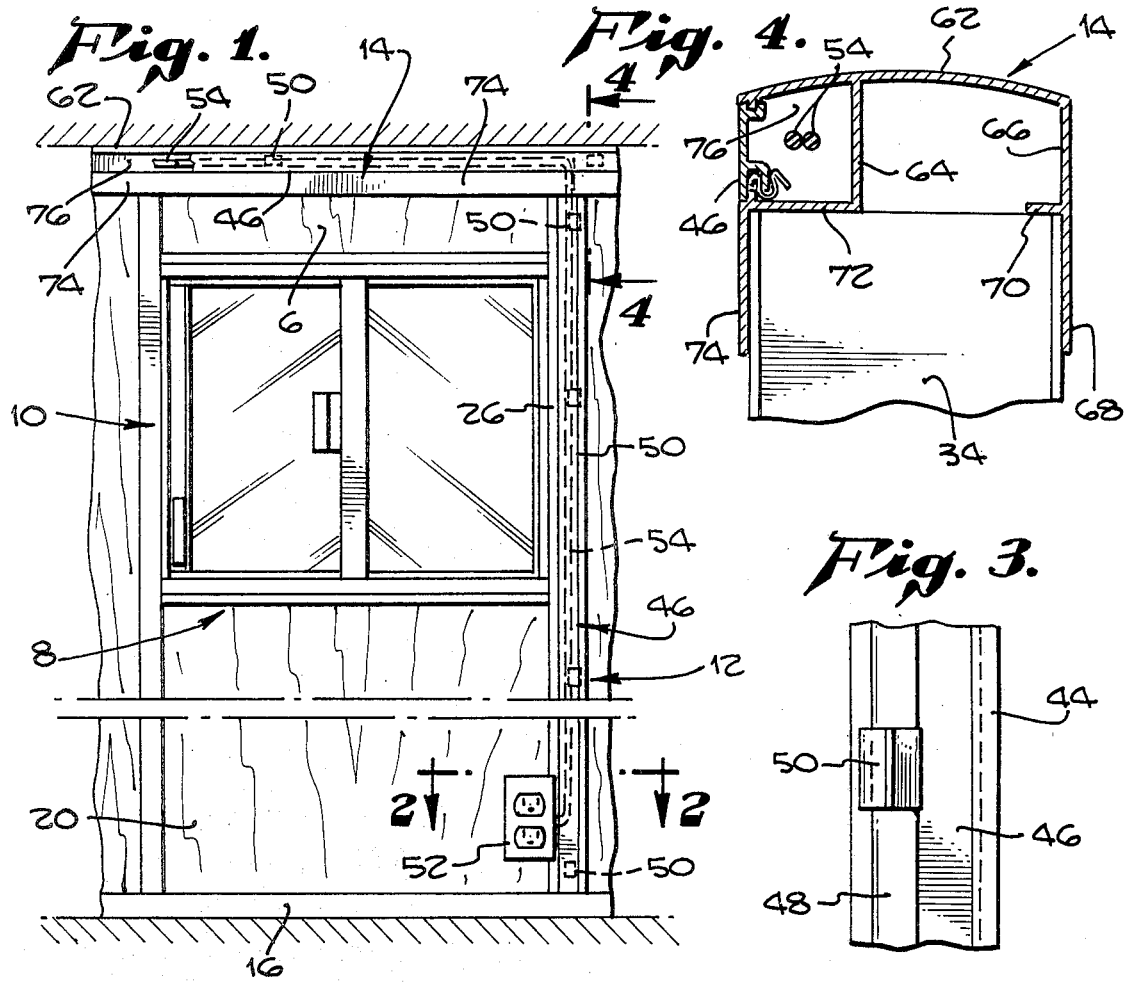
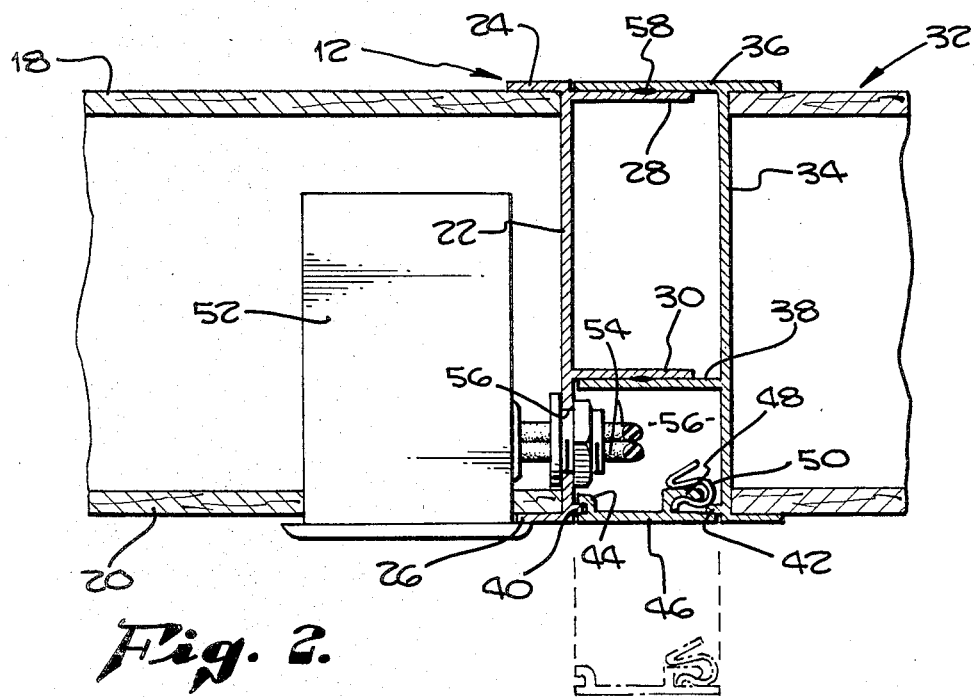

PATIO ENCLOSURE WITH ELECTRICAL CONDUIT HOUSING

FIELD OF THE INVENTION

The invention is specifically in the field of prefabricated wall units for patio enclosures but is adaptable to other uses such as the prefabricated walls of recreational vehicles and mobile homes, the latter more recently being termed "manufactured housing".

PRIOR ART

A closure strip and its securing means, as illustrated herein, is presently being manufactured and sold in conjunction with a preformed electrical conduit channel. However, the present invention is directed to the provision of a channel or housing for electrical conductors which is provided by interfitting portions of modular enclosure panels, said interfitting portions thereby providing a dual function and result.

DISCLOSURE

The objects and advantages of the invention will more fully appear from the following description in connection with the accompanying drawing.

FIG. 1 is a side elevational view of a panel with the location of the electrical conductor means indicated in broken lines.

FIG. 2 is an enlarged sectional detail taken on the line 2—2 of FIG. 1.

FIG. 3 is an enlarged detail in side elevation of a portion of a closure strip.

FIG. 4 is an enlarged sectional detail taken approximately on the line 4—4 of FIG. 1.

There is illustrated a wall section 6 which may or may not be provided with a window indicated generally at 8. The wall section has side frame numbers 10 and 12, a top frame portion 14 and a bottom frame portion 16. Each frame section 6 is provided with an outer panel 18 and an inner panel 20.

The right side member 12 of the panel 6 as viewed in FIGS. 1 and 2 includes a cross web 22 having edges 24 and 26 bent over upon the vertical edges of panels 18 and 20 respectively. Edges 24 and 26 may be secured to the panels 18 and 20 by any suitable means such as rivets, not shown.

The cross web 22 is provided with a pair of secondary webs 28 and 30 which extend from the cross web at right angles thereto. The secondary web 28 lies closely adjacent to the outer edge of the cross web 22 and the other secondary web, 30, is spaced inwardly from the inside edge of said cross web 22.

A next adjacent wall panel 32 is provided with a cross web 34 having secondary webs 36 and 38 extending therefrom and toward the cross web 22 of panel 6. The lengths or lateral extensions of secondary webs 28 and 30, as a pair, or webs 36 and 38, as a pair, are such that the webs of either pair function to maintain the cross webs 22 and 34 in a fixed, spaced relationship. Furthermore, it will be seen that secondary webs 28 and 30 nest between secondary webs 36 and 38.

The secondary webs 30 and 38 and their respective cross webs 22 and 34 define three walls of a channel-like housing which is open at the inner side of the prefabricated wall section 6. At their inner edge portions, said cross webs 22 and 34 are provided with spaced, opposed flanges 40 and 42. The flange 40 is adapted to receive the grooved edge 44 of an elongated closure strip 46. Adjacent the opposite edge of the strip 46 is a lug 48 upon which is mounted a spring clip 50, the latter being adapted to snap behind the flange 42 on the cross web 34. The closure strip can be removed by inserting a relatively sharp instrument between the right edge of the closure strip as viewed in FIG. 2 and the corner of the cross web 34 and displacing the closure strip with a prying movement.

An electrical outlet receptacle 52 can be mounted conveniently in the inner wall panel 20 and electrical conductors 54 can be extended through an opening 56 in the cross web 22 to provide a source of electricity to said receptacle.

In constructing the wall of a patio enclosure consisting of two or more wall sections, the secondary webs 28 and 36 and the webs 30 and 38 can be welded together as at 58, but the conductor channel or housing defined by cross webs 22 and 34 and secondary webs 30 and 38 is readily accessible because of the removable closure strip 46.

In FIG. 4 there is shown the upper portion of the vertically disposed cross web 34 and, in section, the upper frame member 14. It includes a cross web 62 and a pair of secondary webs 64 and 66. The web 66 has a downward extension 68 which provides an outer trim, its vertical location being fixed by a flange 70.

The secondary web 64 extends downwardly to the top of the vertically disposed cross web 34 and thence inwardly as at 72 to the inside edge of the cross web 34. It merges with a downwardly directed trim strip 74. The cross web 62, secondary web 64 and inwardly directed element 72 form three sides of an elongated conductor recess or housing 76. This provides an open side as shown to be closed by a length of closure strip as previously shown in connection with FIG. 2.

It will be seen that by making relatively minor changes in the side and top frame members of modular prefabricated enclosure panels for patios and the like, there has been provided efficient and readily accessible electrical conduit channels for housing said conduit in a safe manner concealed from view. The side and top cross webs with their secondary webs which form sides of said conduit housing can be extruded economically from aluminum or other suitable materials for approximately the same cost as side and top frame members of conventional form but which do not have provision for housing the electrical conduit.

It should be understood that various changes can be made in the form, details, arrangement, and proportions of the various parts without departing from the spirit of the invention.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. In a prefabricated patio enclosure,
    modular wall panels having inner and outer sides and upper and lower and opposite vertical transverse frame members,
    a vertical frame member of a first wall panel having a vertical web extending therefrom at an angle thereto and having a free vertical edge, a vertical frame member of a second wall panel having a vertical web extending therefrom at an angle thereto and having a free vertical edge, a vertical web of one of said wall panels comprising a spacer between adjacent vertical frame members of adjacent wall panels to maintain said adjacent vertical frame members of said adjacent wall panels in a fixed spaced relationship, said vertical webs being spaced inwardly from one of said inner and outer sides of adjacent wall panels to define an elongated conduit housing having an open side of a width determined by the fixed spaced relationship between adjacent wall panels, electrical conductor means in said housing, and a closure strip closing the open side of said elongated conduit housing.

2. The structure in claim 1, and said closure strip being movable to permit access to said housing.

3. The structure in claim 1, and an additional vertical web extending from each vertical frame member in spaced relation to its companion web, and the vertical webs of said first panel nesting with those of said second panel and providing uniformity of spacing between adjacent panels.

* * * * *